US010446305B1

United States Patent
Gross et al.

(10) Patent No.: US 10,446,305 B1
(45) Date of Patent: *Oct. 15, 2019

(54) MAGNETIC NANOCOMPOSITES AND METHODS OF FORMING MAGNETIC NANOCOMPOSITES

(71) Applicant: HRL Laboratories, LLC, Malibu, CA (US)

(72) Inventors: Adam F. Gross, Santa Monica, CA (US); John J. Vajo, West Hills, CA (US); Andrew P. Nowak, Los Angeles, CA (US); Eliana V. Ghantous, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1089 days.

This patent is subject to a terminal disclaimer.

(21) Appl. No.: 14/570,931

(22) Filed: Dec. 15, 2014

Related U.S. Application Data

(60) Provisional application No. 61/916,175, filed on Dec. 14, 2013.

(51) Int. Cl.
*H01F 1/01* (2006.01)
*B82Y 30/00* (2011.01)
(Continued)

(52) U.S. Cl.
CPC ....... *H01F 1/0306* (2013.01); *B29C 71/0072* (2013.01); *H01F 41/00* (2013.01); *B29L 2031/00* (2013.01)

(58) Field of Classification Search
None
See application file for complete search history.

(56) References Cited

U.S. PATENT DOCUMENTS

| | | | |
|---|---|---|---|
| 2009/0052029 A1* | 2/2009 | Dai | B82Y 20/00 359/485.02 |
| 2010/0231433 A1* | 9/2010 | Tishin | C04B 38/02 342/1 |

(Continued)

OTHER PUBLICATIONS

Vazquez (Physica B, 2006, vol. 384, p. 36-40).*

(Continued)

*Primary Examiner* — Xiaowei Su
(74) *Attorney, Agent, or Firm* — O'Connor & Company

(57) ABSTRACT

Magnetic nanocomposites are disclosed with aligned, rod-shaped, rare-earth-free and Pt-free metal domains in a rigid, non-metallic matrix. In some variations, the invention provides a magnetic nanocomposite comprising metallic nanorods dispersed within a continuous and rigid non-metallic matrix. The nanorods have an average nanorod length-to-width ratio of at least 2. The nanorods are alignable and may be aligned in one axial direction with magnetic or mechanical forces. Some variations provide a method of forming a magnetic nanocomposite, comprising: dispersing metal oxide nanorods into a hardenable non-metallic material; thermally or chemically reducing the metal oxide nanorods to form magnetic metallic nanorods; aligning nanorods in one axial direction within the hardenable non-metallic material; and hardening the non-metallic material to form a continuous and rigid non-metallic matrix containing the metallic nanorods.

24 Claims, 14 Drawing Sheets

(51) Int. Cl.
*H01F 1/03* (2006.01)
*B29C 71/00* (2006.01)
*H01F 41/00* (2006.01)
*B29L 31/00* (2006.01)

(56) References Cited

U.S. PATENT DOCUMENTS

| | | | | |
|---|---|---|---|---|
| 2011/0278058 A1* | 11/2011 | Sundararaj | ............. | G06F 1/182 |
| | | | | 174/520 |
| 2013/0063296 A1* | 3/2013 | Hennig | ................. | H01Q 1/245 |
| | | | | 342/1 |
| 2014/0225041 A1* | 8/2014 | Archer | ................. | H01M 4/364 |
| | | | | 252/503 |
| 2015/0163967 A1* | 6/2015 | Chu | ........................ | H05K 9/00 |
| | | | | 428/34.1 |

OTHER PUBLICATIONS

Padalka (IEEE Transactions on Magnetics, 2010, vol. 46, p. 2275-2277).*
Chen (Composite Science and Technology, 2008, vol. 68, p. 3388-3395).*
Liu (Applied Physics Letters, 2007, vol. 91, No. 093101).*

* cited by examiner

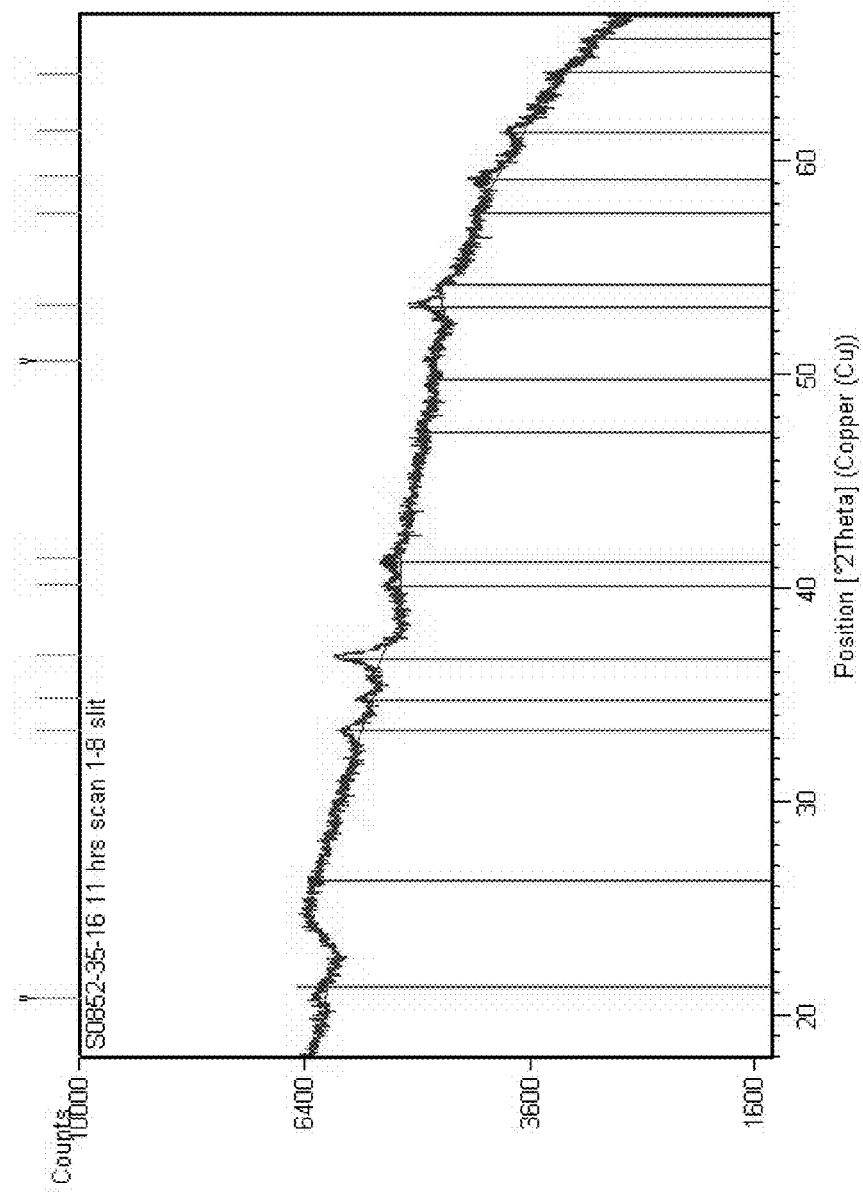

MAGNETIC NANOCOMPOSITES AND METHODS OF FORMING MAGNETIC NANOCOMPOSITES

PRIORITY DATA

This patent application is a non-provisional application claiming priority to U.S. Provisional Patent App. No. 61/916,175, filed Dec. 14, 2013, which is hereby incorporated by reference herein.

FIELD OF THE INVENTION

The present invention generally relates to magnetic materials, in particular magnetic nanocomposites, and methods for making magnetic nanocomposites.

BACKGROUND OF THE INVENTION

A magnet is a material or object that produces a magnetic field. A permanent magnet is an object made from a material that is magnetized and creates its own persistent magnetic field. An electromagnet is made from a coil of wire that acts as a magnet when an electric current passes through it but stops being a magnet when the current stops.

Materials that can be magnetized, which are also the ones that are strongly attracted to a magnet, are called ferromagnetic. These include iron, nickel, cobalt, some alloys of rare earth metals, and some naturally occurring minerals such as lodestone. Although ferromagnetic materials are the only ones attracted to a magnet strongly enough to be commonly considered magnetic, all other substances respond weakly to a magnetic field, by one of several other types of magnetism.

Ferromagnetic materials can be divided into magnetically soft materials like annealed iron, which can be magnetized but do not tend to stay magnetized, and magnetically hard materials, which do tend to stay magnetized. Permanent magnets are made from hard ferromagnetic materials such as alnico and ferrite that are subjected to special processing in a powerful magnetic field during manufacture, to align their internal microcrystalline structure, making them very hard to demagnetize. To demagnetize a saturated magnet, a certain magnetic field must be applied, and this threshold depends on coercivity of the respective material. Hard materials have high coercivity, whereas soft materials have low coercivity.

For certain applications, magnet operating temperatures are high, such as 100-300° C. Known magnets that are suitable for such applications employ rare-earth elements, which can have significant cost and supply fluctuations.

What is desired is magnets with energy densities equal to high-temperature grade NdFeB magnets at lower cost. Preferably, the magnets have higher energy density than alnico, ferrites, and SmCo magnets, and if possible would be based on iron which is inexpensive. Generally, there is a real need to improve existing commercial and research approaches to magnets.

For example, NdFeB magnets consist of needle-shaped domains of $Nd_2Fe_{14}B$ doped with Dy or Tb. These magnets have the highest energy product of 52 MG.Oe available in any commercial magnet and are described in Herbst, *Rev. Mod. Phys.* 1981, 63, 819. The main disadvantages are the high cost of Nd, Dy and/or Tb and supply disruptions of these elements, and low Curie temperatures that restrict operation to below 80-200° C. They are sold as sintered grains of $Nd_2Fe_{14}B$ or $Nd_2Fe_{14}B$ needles bonded in a polymer matrix.

SmCo magnets have very high coercivity and can operate up to 350° C. The main disadvantages are the cost of Sm and Co, and reduced energy product as compared to NdFeB magnets.

Alnico magnets consist of FeCo rod-shaped domains in an Al and Ni matrix as described in Luborsky, *J. Appl. Phys.* 1966, 3, 1091. Such magnets have energy products of 5-9 MG.Oe, which are much lower than magnets with rare-earth elements.

Lodex magnets were created in the 1950s and consist of Fe whiskers that are electroplated in Hg and then aligned and embedded in lead. They have energy products of 5 MG.Oe and are described in Falk, *J. Appl. Phys.* 1966, 37, 1108.

Magnetic recording tapes consist of anisotropic metal particles consisting of Fe or FeCo in a binder as described in Hisano et al., *Magn. Magn. Mater.* 1998, 190, 371. The particles are made from $Fe_2O_3$ or FeOOH, coated in $Al_2O_3$ and $Y_2O_3$, where the iron oxides are reduced to iron. In earlier incarnations of magnetic tapes, the magnetic recording particles consisted of alumina-coated iron particles. A flexible matrix, such as the ones used in tapes, would deform during use of a magnet in a motor.

Exchange-spring magnets consist of hard and soft magnetic phases adjacent to one another. The hard magnet provides coercivity and the soft magnet provides a high magnetic moment. Examples of these materials are described in Rui et al., *Magn. Magn. Mater.* 2008, 320, 2576 and in Zeng et al., *Nature* 2002, 420, 395. These materials are hard to fabricate and have round magnetic domains.

U.S. Pat. Nos. 5,591,535 and 6,506,264 describe a process for forming iron nanorods coated with alumina and a rare earth oxide. US Patent App. Pub. No. 2012/0244356 describes $Fe_{16}N_2$ rod-shaped particles for use in magnetic recording and magnets. This publication does not teach how to make the particles into a magnet.

FePt or CoPt nanorods can be formed through a wet chemical process. An example of this is described in Chen et al., *J. Am. Chem. Soc.* 2007, 129, 6348. The nanorods can be assembled into aligned arrays under a magnetic field.

Magnetic nanoparticles have been formed in carbon nanotube arrays. An example of this is described in Shi et al., *J. Appl. Phys.* 2008, 104, 034307.

In view of the state of the art discussed above, there remains a significant commercial need to improve magnet compositions/composites, methods for making them, and systems that incorporate these magnets.

SUMMARY OF THE INVENTION

The present invention addresses the aforementioned needs in the art, as will now be summarized and then further described in detail below.

In some variations, the invention provides a magnetic nanocomposite comprising magnetic metallic nanorods dispersed within a substantially continuous and rigid non-metallic matrix, wherein the nanorods have an average nanorod length-to-width ratio of at least 2, and wherein the nanorods are essentially free of rare-earth elements.

In preferred embodiments, at least a portion of the nanorods are aligned (or at least alignable) in one axial direction. In some embodiments, essentially all of the nanorods are aligned in one axial direction.

The average nanorod length-to-width ratio, in some embodiments, is at least 4. The nanorods may have an average diameter of about 60 nanometers or less.

In some embodiments, the nanorods are present from about 10 vol % to about 90 vol % of the magnetic nanocomposite, such as from about 30 vol % to about 70 vol % of the magnetic nanocomposite.

The nanorods may contain one or more materials selected from the group consisting of iron, iron-cobalt alloys, iron-nickel alloys, iron-gallium alloys, and oxides, oxyhydroxides, nitrides, sulfides, or carbides thereof. Preferably, the nanorods are essentially free of precious metals (such as platinum). At least some of the nanorods may optionally be coated with a metal oxide.

The matrix may be a thermoset material cured from a viscous-liquid or soft-solid precursor material. In some embodiments, the matrix is formed from a material selected from the group consisting of graphitic carbon, glassy carbon, polyfurfuryl alcohol, resorcinol-formaldehyde, and combinations or derivatives thereof.

Optionally, the magnetic nanocomposite further contains one or more magnetic additives dispersed within the matrix. For example, magnetic additives may be selected from the group consisting of iron nanoparticles, cobalt nanoparticles, nickel nanoparticles, iron oxide nanoparticles, iron oxyhydroxide nanoparticles, cobalt oxide nanoparticles, cobalt ferrite nanoparticles, and combinations thereof.

Some variations provide a method of forming a magnetic nanocomposite, the method comprising:

(a) dispersing metal oxide nanorods into a hardenable non-metallic material;

(b) thermally or chemically reducing the metal oxide nanorods to form magnetic metallic nanorods;

(c) before, during, or after step (b), aligning at least a portion of the metal oxide or metallic nanorods in one axial direction within the hardenable non-metallic material; and (d) hardening the hardenable non-metallic material to form a substantially continuous and rigid non-metallic matrix containing the metallic nanorods, wherein the metallic nanorods have an average nanorod length-to-width ratio of at least 2.

In some embodiments, the metal oxide or metallic nanorods are aligned in step (c) using magnetic forces. In these or other embodiments, the metal oxide or metallic nanorods are aligned in step (c) using physical forces (e.g., shearing).

In some methods, essentially all of the metal oxide or metallic nanorods are aligned in step (c) in one axial direction. The aligning step may be performed prior to reducing in step (b), following reducing, or simultaneously with the thermal or chemical reduction in step (b).

In some embodiments, the reducing in step (b) comprises introduction of a reducing agent selected from the group consisting of hydrogen, carbon, carbon monoxide, synthesis gas, methane, hydrogen sulfide, and combinations thereof. In certain embodiments, the reducing agent is hydrogen. The reducing in step (b) may utilize carbothermal reduction of the metal oxide nanorods to the metallic nanorods.

The reducing and the hardening may be performed simultaneously, to form a substantially continuous and rigid non-metallic matrix containing the metallic nanorods.

The metallic nanorods may contain one or more materials selected from the group consisting of iron, iron-cobalt alloys, iron-nickel alloys, iron-gallium alloys, and oxides, oxyhydroxides, nitrides, sulfides, or carbides thereof. In preferred embodiments, the metallic nanorods are essentially free of rare-earth elements or precious metals.

In some embodiments of the invention, the hardenable non-metallic material is a viscous liquid or soft solid, while the non-metallic matrix is a thermoset material. The non-metallic matrix may be formed from a material selected from the group consisting of graphitic carbon, glassy carbon, polyfurfuryl alcohol, resorcinol-formaldehyde, and combinations or derivatives thereof.

The non-metallic matrix may further contain one or more magnetic matrix additives selected from the group consisting of iron nanoparticles, cobalt nanoparticles, nickel nanoparticles, iron oxide nanoparticles, iron oxyhydroxide nanoparticles, cobalt oxide nanoparticles, cobalt ferrite nanoparticles, and combinations thereof.

BRIEF DESCRIPTION OF THE DRAWINGS

FIG. 5B shows an XRD pattern of FeOOH nanorods, confirming the resulting nanorods to be FeOOH (reference pattern matches the data), in Example 4.

DETAILED DESCRIPTION OF EMBODIMENTS OF THE INVENTION

Figure 1:
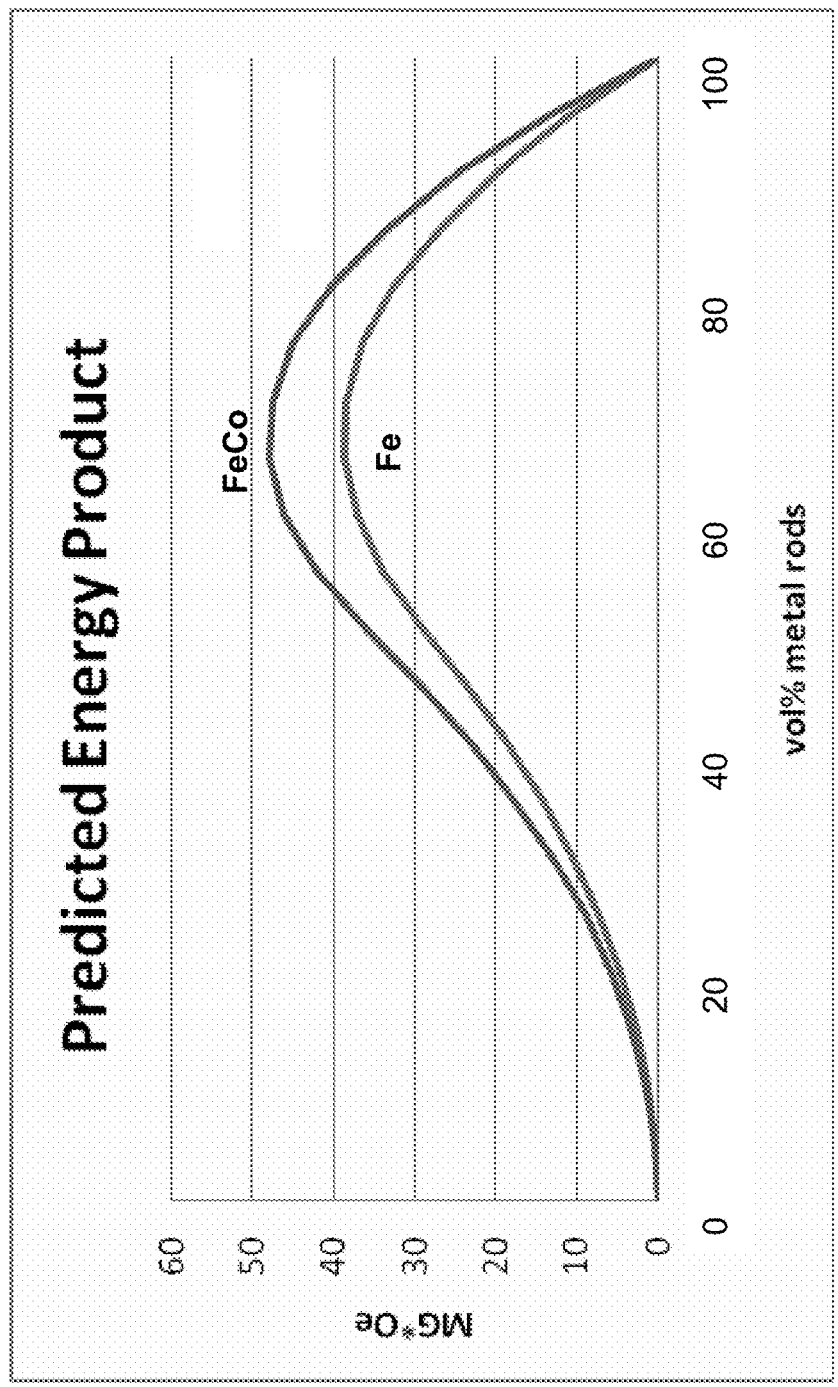
FIG. 1 plots the theoretical prediction of energy products of aligned arrays of Fe or FeCo nanorods, in Example 1.

The compositions, composites, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The present invention, in some variations, provides a magnetic nanocomposite that includes a magnetic material with a high energy product made from low-cost metal nanorods aligned in a non-metallic matrix. Aligned, small-diameter rods of iron or iron-cobalt alloys are advantageous because the shape and the alignment each enhance the hardness or coercivity, which in turn increases the energy density of a magnet made from these magnetic nanocomposites. Furthermore, the nanorods disclosed herein do not contain expensive rare-earth elements (such as neodymium) or precious metals (such as platinum).

A non-metallic matrix preferably is rigid and continuous around the nanorods and preferably maintains particle orientation when heated. A non-metallic matrix will generally have a lower mass than a metallic matrix. A non-metallic matrix is normally less conductive than a metal and therefore reduces magnetic field-induced heating of the magnetic nanocomposite in an electric motor, for example.

A magnetic nanocomposite material may be formed from anisotropic rod-shaped metal domains in a rigid, non-metallic continuous matrix. The magnetic nanocomposite material preferably does not include a metallic matrix around the magnetic domains. The magnetic nanocomposite material preferably does not contain rare-earth elements or platinum (other than arising from impurities). Also, the magnetic nanocomposite material preferably does not (intentionally) contain round domains without shape anisotropy, again noting that round domains may arise from impurities, additives incorporated for a different purpose, defects, surface-tension minimization of nanorods, etc.

Magnetic nanocomposites disclosed herein can provide the performance of higher-cost, rare earth element-based magnets at lower cost and mass by structuring low-cost metals instead of using rare earths, which can have significant cost and supply fluctuations. Magnetic nanocomposites disclosed herein can also provide equal or better performance compared to existing nanorod-based magnets at lower mass, due to a lower-density non-metallic matrix employed in the magnetic nanocomposites herein.

Some variations of this invention provide a bulk magnet formed from aligned, anisotropic rod-shaped, rare-earth-free and Pt-free metal domains in a rigid, non-metallic matrix to create a high-energy-product magnet. This invention is validated with, but not limited by, theory.

Magnetic induction B (also known as magnetic flux density) has the unit tesla T ($Wb/m^2$). The gauss, abbreviated as G or Gs, is the cgs unit of measurement of a magnetic field B. One tesla is equal to $10^4$ gauss. A magnetizing field, H, is measured in amperes per meter. The magnetic flux density, B, and the magnetic field strength, H, are related by the magnetic permeability $\mu$, according to $B=\mu H$. The permeability $\mu$ is the measure of the ability of a material to support the formation of a magnetic field within itself. Permeability is the degree of magnetization that a material obtains in response to an applied magnetic field. The auxiliary magnetic field H represents how a magnetic field B influences the organization of magnetic dipoles in a given medium, including dipole migration and magnetic dipole reorientation.

The coercivity, also called the magnetic coercivity, coercive field, or coercive force, is a measure of the ability of a ferromagnetic material to withstand an external magnetic field without becoming demagnetized. For ferromagnetic materials, the coercivity is the intensity of the applied magnetic field required to reduce the magnetization of that material to zero after the magnetization of the sample has been driven to saturation. Coercivity is usually measured in Oersted (Oe) or ampere/meter and may be denoted H. Coercivity can be measured using a B-H analyzer or magnetometer. Ferromagnetic materials with high coercivity are called magnetically hard materials.

Energy product, $(BH)_{max}$, is the volumetric energy density of a magnet. A motor with higher $(BH)_{max}$ magnets will have more power than one with similar sized magnets with lower energy products. $(BH)_{max}$ is defined the peak energy that a magnet can deliver when operating at a working point on the demagnetization curve and may be measured in Mega-Gauss-Oersteds (MG.Oe). To obtain the highest possible energy product, a magnet must have a high coercivity or hardness as well as a high magnetic moment per atom.

Several features provided by variations of this invention contribute to $(BH)_{max}$. First, the rod-shape domains have small diameters to force the magnetization to reverse cohesively, which increases coercivity. If iron-containing nanorods are less than 12 nm in diameter or if iron-cobalt nanorods are between 10 and 70 nm, then cohesive reversal is theoretically predicted to occur. This phenomenon is explained on pages 368-372 of *Introduction to Magnetic Materials*, 2nd edition, Cullity and Graham, Wiley, New Jersey 2011 (hereinafter "Cullity"), which is hereby incorporated by reference herein.

Furthermore, rod-shape domains leverage shape anisotropy to increase the hardness of iron or iron-cobalt alloy magnets. Table 9.1 on page 319 of Cullity shows that as the aspect ratio of an iron rod increases from a round particle to an infinite rod, the coercivity changes from the intrinsic crystalline anisotropy-based coercivity of 560 Oe to 108000 Oe. Even a rod with a 5:1 axial:radial aspect ratio has a coercivity of 8950 Oe.

The rod-shaped domains may be made from iron or alloys of iron-cobalt, iron-nitrogen, or iron-gallium. This is advantageous because iron and cobalt have very high magnetic moments per atom, thereby increasing the energy product $(BH)_{max}$. Furthermore, iron and cobalt have high Curie temperatures of 770° C. and 1130° C., respectively, which allows magnets made of these materials to operate at and retain their energy product to higher temperatures compared to existing NdFeB-based magnets. NdFeB (neodymium-iron-boron) has a Curie temperature of 350° C. and NdFeB with added Dy (dysprosium) has a maximum operating temperature of 80° C. with 6% Dy and 200° C. with 12% Dy.

The rod-shaped domains are preferably aligned in a matrix. This alignment results in a higher remnant magnetization which results in increased coercivity and increased energy product $(BH)_{max}$. The matrix is rigid which maintains nanorods alignment. Furthermore, the rigidity of the matrix is preferably maintained up to 500° C. which keeps the magnets from deforming when used at elevated temperatures. This allows the magnets to be used in high-temperature electric motors and not require the motors to be air-cooled or liquid-cooled.

The matrix is substantially non-metallic, and preferably completely non-metallic. This reduces the mass of the magnets and inhibits induction heating of the magnets when used in a motor by reducing the electrical conductivity. The matrix is continuous and holds the magnet together. This results in a magnet that can withstand force on it without breaking apart. The matrix may contain magnetic additives such as magnetic nanoparticles which support electromagnetic coupling between nanorods.

In some variations, the invention provides a magnetic nanocomposite comprising magnetic metallic nanorods dispersed within a substantially continuous and rigid non-metallic matrix, wherein the nanorods have an average nanorod length-to-width ratio of at least 2, and wherein the nanorods are essentially free of rare-earth elements.

By "nanorod" is meant a rod-shaped particle or domain with a diameter of less than 100 nanometers. Nanorods are nanostructures shaped like long sticks or dowels with a diameter in the nanoscale but a length that is longer or possibly much longer (like needles). Nanorods may also be referred to as nanopillars, nanorod arrays, or nanopillar arrays.

The average diameter of the nanorods may be selected from about 0.5 nanometers to about 100 nanometers, such as from about 1 nanometer to about 60 nanometers. In some embodiments, the nanorods have an average diameter of about 60 nanometers or less. The average axis length of the nanorods may be selected from about 1 nanometer to about 1000 nanometers, such as from about 5 nanometers to about 500 nanometers. When the aspect ratio is large, the length may be in the micron scale.

The nanorod length-to-width ratio is equal to the aspect ratio, which is the axial length divided by the diameter. Nanorods need not be perfect cylinders, i.e. the axis is not necessarily straight and the diameter is not necessarily a perfect circle. In the case of geometrically imperfect cylinders (i.e. not exactly a straight axis or a round diameter), the aspect ratio is the actual axial length, along its line of curvature, divided by the effective diameter, which is the diameter of a circle having the same area as the average cross-sectional area of the actual nanorod shape.

The nanorod length-to-width ratio is at least 2. The average nanorod length-to-width ratio, in some embodiments, is at least about 2.5, 3, 3.5, 4, 4.5, 5, 5.6, 6, 6.5, 7, 8, 9, 10, or higher than 10. In certain embodiments, the average nanorod length-to-width ratio is greater than 4.

In some embodiments, the nanorods are present from about 10 vol % to about 90 vol % of the magnetic nanocomposite, such as from about 30 vol % to about 70 vol % of the magnetic nanocomposite. In certain embodiments, the nanorods form from 33 vol % to 65 vol % of the magnetic nanocomposite. For example, the nanorods may be present at a volume concentration of about 30, 35, 40, 45, 50, 55, 60, or 65 vol % of the magnetic nanocomposite.

The nanorods may contain one or more materials selected from the group consisting of iron, iron-cobalt alloys, iron-nickel alloys, iron-gallium alloys; oxides, oxyhydroxides, nitrides, sulfides, or carbides thereof; and combinations of any of the foregoing materials. The nanorods are also essentially free of rare-earth elements, such as samarium, neodymium, or dysprosium. Trivial amounts of rare-earth elements may be present due to impurities. Preferably, the nanorods are also essentially free of precious metals, such as platinum, gold, or rhodium.

At least some of the nanorods may optionally be coated with a metal oxide. Exemplary metal oxides for such a coating include, but are not limited to, aluminum oxide, nickel oxide, copper oxide, iron oxide, cobalt oxide, zinc oxide, and silica. Combinations of metal oxides may be employed to coat the nanorods.

In preferred embodiments, at least a portion of the nanorods are aligned (or at least alignable) in one axial direction. In some embodiments, essentially all of the nanorods are aligned in one axial direction. The nanorods may be aligned in various ways. For example, the nanorods may be aligned in the presence of an alternating current (AC) magnetic field or a direct current (DC) magnetic field. Alternatively, or additionally, mechanical forces may be utilized to align the nanorods. As one example, shear forces may be subjected to the nanorods contained in an unhardened matrix precursor, prior to curing or simultaneously with curing.

Preferably, at least some of the nanorods are forced into alignment in one axial direction. That is, nanorod alignment is preferentially along one dimension defined by the nanorod axis of length (which may be the average long axis direction defined by all nanorods collectively). Aligned nanorods may be parallel to each other in one or two dimensions.

In some embodiments, at least 10%, 20%, 30%, 40%, 50%, 60%, 70%, 80%, 90% or more of the nanorods are substantially aligned with each other. By "substantially aligned" it is meant that two nanorods are aligned within 5% of each other, measured by the angle between long axes of the two nanorods.

In some embodiments, at least 10%, 20%, 30%, 40%, 50%, 60%, 70%, 80%, 90% or more of the nanorods are completely aligned with each other. By "completely aligned" it is meant that two nanorods are aligned within 1% of each other, measured by the angle between long axes of the two nanorods. "Perfectly aligned" nanorods, in principle, are aligned with each other, within measurement error of the angle between the two long axes.

Another measure of nanorod alignment is the standard deviation of nanorod long axis angle from the average long axis direction defined by all nanorods collectively. In the theoretical case of perfect alignment of many nanorods, the standard deviation is zero. In some embodiments, the standard deviation of nanorod long axis angle from the average long axis direction defined by all nanorods collectively is about, or less than about, 25%, 20%, 15%, 10%, 5%, 4%, 3%, 2%, 1%, 0.5%, or 0.1%.

The non-metallic matrix, after curing, hardening, or otherwise being formed, is substantially rigid and substantially continuous. By "substantially rigid" it is meant that at least 90% of the matrix is a thermoset material that is capable of holding aligned nanorods in place. Preferably, at least 95%, 99%, or 99.9% of the matrix is a thermoset material that is capable of holding aligned nanorods in place. By "substantially continuous" it is meant that the matrix surrounds at least 90% of the nanorods, forming an interconnected region of material, rather than discrete regions. Preferably, the matrix surrounds at least 95%, 99%, or 99.9% of the nanorods, noting that in some cases nanorods at the surface of the matrix may be exposed to the environment and therefore not surrounded by matrix material. Nanoscale-sized porous voids may be present at or near the surface of nanorods, depending on the interfacial equilibrium spacing between nanorods and matrix material The matrix is substantially non-metallic, and preferably completely non-metallic (separate from possible additives that may contain metals, as described below). The matrix may be a thermoset material cured from a precursor material that is a viscous liquid/slurry, or a soft solid. In particular, a rigid thermoset begins as a soft solid or viscous precursor and changes irreversibly into a typically infusible, insoluble network by curing. In some embodiments, the matrix is formed from a material selected from the group consisting of graphitic carbon, glassy carbon, polyfurfuryl alcohol, resorcinol-formaldehyde, and combinations or derivatives thereof.

The non-metallic matrix may be non-magnetic or magnetic. For example, the matrix may comprise a magnetic form of carbon (e.g., graphene). The matrix may itself be non-magnetic but include magnetic additives. In some embodiments, the magnetic nanocomposite contains one or more magnetic additives dispersed within the matrix. For example, magnetic additives may be selected from the group consisting of iron nanoparticles, cobalt nanoparticles, nickel nanoparticles, iron oxide nanoparticles (e.g., $Fe_3O_4$ or FeOOH), iron oxyhydroxide nanoparticles, cobalt oxide nanoparticles (e.g., $Co_3O_4$), cobalt ferrite nanoparticles, and combinations thereof.

In some variations, the invention provides a magnetic nanocomposite comprising magnetic iron-containing nanorods dispersed within a substantially continuous and rigid non-metallic matrix, wherein the nanorods have an average nanorod length-to-width ratio of at least 2, and wherein the nanorods are essentially free of rare-earth elements and precious metals.

The nanorods are anisotropic. As meant herein, "anisotropic" nanorods have at least one chemical or physical property that is directionally dependent. When measured along different axes, an anisotropic nanorod will have some variation in a measurable property. The property may be physical (e.g., geometrical) or chemical in nature, or both. The property that varies along multiple axes may simply be the presence of mass; for example, a perfect sphere would be geometrically isotropic while a cylinder is geometrically anisotropic. A chemically anisotropic nanorod may vary in composition from the surface to the bulk phase, such as via a chemically modified surface or a coating (e.g., metal oxide) deposited on the nanorod surface. The amount of variation of a chemical or physical property, measured along different axes, may be 5%, 10%, 20%, 30%, 40%, 50%, 75%, 100% or more.

The hardness or coercivity can have anisotropy. Thus the nanorods will typically be magnetically harder in one direction than the other. This is an effect of shape anisotropy. $(BH)_{max}$ includes coercivity, so the nanorods can have a greater energy product along the nanorod (long axis) as opposed to across the nanorod (short axis).

The nanorods are not a single, continuous framework in the nanocomposite. Rather, the nanorods are non-continuous and dispersed in the continuous matrix. Electromagnetic connections may be introduced via additives that form a magnetically continuous connection among nanorods. The additives can support stronger magnetic fields in the matrix.

In some embodiments, the nanocomposite offers a repeating, self-similar structure that allows the nanocomposite to be abraded during use while retaining its magnetic properties. Should the surface be modified due to environmental events or influences, the self-similar nature of the nanocomposite allows the freshly exposed surface to present a nanocomposite identical to that which was removed.

In some embodiments, a process for fabricating a magnetic nanocomposite includes preparing a hardenable material, introducing nanorods into the hardenable material to form a fluid mixture (solution or suspension), applying the fluid mixture to a selected surface, aligning the nanorods (e.g. with electromagnetic or physical forces), and allowing the fluid mixture to cure to form a solid. The hardenable material is essentially the precursor to the continuous matrix; that is, the hardened or cured form of the hardenable material is the continuous matrix of the magnetic nanocomposite.

In some embodiments, the hardenable material is a crosslinkable polymer selected from the group consisting of urethanes, epoxies, acrylics, phenolic resins including urea-formaldehyde resins and phenol-formaldehyde resins, siloxanes, alkyd resins, thiolenes, ethers, esters, amides, and combinations thereof. The hardenable material may be combined with one or more additives selected from the group consisting of fillers, colorants, UV absorbers, defoamers, plasticizers, viscosity modifiers, density modifiers, catalysts, and scavengers.

Some embodiments provide a magnetic nanocomposite precursor material comprising magnetic metallic nanorods dispersed within a hardenable material capable of forming a substantially continuous and rigid non-metallic matrix, wherein said nanorods have an average nanorod length-to-width ratio of at least 2, and wherein said nanorods are essentially free of rare-earth elements.

The magnetic nanocomposite precursor material may be converted to the final magnetic nanocomposite in various ways. In some embodiments, the method encompasses forming nanorods of an easily formed oxide, aligning them in a matrix, and reducing them in the matrix to a magnetic metal or alloy. This approach utilizes the matrix to retain the shape of the nanorods through reduction and to counteract the high surface energy of iron that drives liquid iron towards an undesirable round shape. This approach also allows annealing the rods in the matrix without loss of shape.

In other embodiments, the method involves reducing nanorods of an easily formed oxide into iron or iron alloys and aligning them in a matrix. This approach does not require the matrix to maintain the shape of the nanorods.

Some variations provide a method of forming a magnetic nanocomposite, the method comprising:

(a) dispersing metal oxide nanorods into a hardenable non-metallic material;

(b) thermally or chemically reducing the metal oxide nanorods to form magnetic metallic nanorods;

(c) before, during, or after step (b), aligning at least a portion of the metal oxide or metallic nanorods in one axial direction within the hardenable non-metallic material; and (d) hardening the hardenable non-metallic material to form a substantially continuous and rigid non-metallic matrix containing the metallic nanorods, wherein the metallic nanorods have an average nanorod length-to-width ratio of at least 2.

In some embodiments, the metal oxide or metallic nanorods are aligned in step (c) using magnetic forces. In these or other embodiments, the metal oxide or metallic nanorods are aligned in step (c) using physical forces (e.g., shearing).

In some methods, essentially all of the metal oxide or metallic nanorods are aligned in step (c) in one axial direction. The aligning step may be performed prior to reducing in step (b), following reducing, or simultaneously with the thermal or chemical reduction in step (b).

In some embodiments, the reducing in step (b) comprises introduction of a reducing agent selected from the group consisting of hydrogen, carbon, carbon monoxide, synthesis gas, methane, hydrogen sulfide, and combinations thereof. In certain embodiments, the reducing agent is hydrogen. The reducing in step (b) may utilize carbothermal reduction of the metal oxide nanorods to the metallic nanorods.

The reducing and the hardening may be performed simultaneously, to form a substantially continuous and rigid non-metallic matrix containing the metallic nanorods.

The metallic nanorods may contain one or more materials selected from the group consisting of iron, iron-cobalt alloys, iron-nickel alloys, iron-gallium alloys, and oxides, oxyhydroxides, nitrides, sulfides, or carbides thereof. In preferred embodiments, the metallic nanorods are essentially free of rare-earth elements or precious metals.

In some method embodiments, the hardenable non-metallic material is a viscous liquid or soft solid, while the non-metallic matrix is a thermoset material. The non-metallic matrix may be formed from a material selected from the group consisting of graphitic carbon, glassy carbon, polyfurfuryl alcohol, resorcinol-formaldehyde, and combinations or derivatives thereof.

The non-metallic matrix may further contain one or more magnetic matrix additives selected from the group consisting of iron nanoparticles, cobalt nanoparticles, nickel nanoparticles, iron oxide nanoparticles, iron oxyhydroxide nanoparticles, cobalt oxide nanoparticles, cobalt ferrite nanoparticles, and combinations thereof.

The fluid mixture (magnetic nanocomposite precursor material) may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid mixture may be rapidly sprayed or cast over large areas.

When a solvent is present in the fluid mixture, the solvent may include one or more compounds selected from the group consisting of alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), organic acids, and any mixtures thereof. When a solvent is present, it may be in a concentration of from about 10 wt % to about 99 wt % or higher, for example. An effective amount of solvent is an amount of solvent that dissolves at least 95% of the hardenable material present. Preferably, a solvent does not adversely impact the formation of the hardened (e.g., crosslinked) network.

When a carrier fluid is present in the fluid mixture, the carrier fluid may include one or more compounds selected from the group consisting of water, alcohols, ketones, acetates, hydrocarbons, acids, bases, and any mixtures thereof. When a carrier fluid is present, it may be in a concentration of from about 10 wt % to about 99 wt % or higher, for example. An effective amount of carrier fluid is an amount of carrier fluid that suspends at least 95% of the hardenable material present. A carrier fluid may also be a solvent, or may be in addition to a solvent, or may be used solely to suspend but not dissolve the hardenable material. A carrier fluid may be selected to suspend the nanorods in conjunction with a solvent for dissolving the hardenable material, in some embodiments.

The overall thickness of the object (i.e., the magnetic composite or a product incorporating the composite) may be from about 100 nm to about 1 cm or more, such as about 1 µm, 10 µm, 20 µm, 25 µm, 30 µm, 40 µm, 50 µm, 75 µm, 100 µm, 500 µm, 1 mm, 1 cm, or 10 cm.

EXAMPLES

Example 1: Estimation of Energy Product of Aligned Nanorods

By following Skomski et al., "Permanent magnetism of dense-packed nanostructures" *J. Appl. Phys.* 2010, 107, 09A739 (which is hereby incorporated by reference herein) and using the saturation magnetization of iron, 21570 G, or the saturation magnetization of an 1:1 iron-cobalt alloy, 24000 G, the energy product of an array of aligned, rod-shaped nanostructures may be calculated versus volume fraction. This model takes into account demagnetizing interactions between nanostructures.

FIG. 1 plots the theoretical prediction of energy products of aligned arrays of Fe or FeCo nanorods. The data in FIG. 1 shows that a 50 vol % Fe nanorod composite will have an energy product of 29 MG.Oe while a 50 vol % FeCo nanorod composite will have an energy product of 36 MG.Oe. Note that 24 kG saturation magnetizations are reported in FeCo alloys with a range of stoichiometries from 2:1 to 1:1.

This model demonstrates the potential of this invention to produce high-energy-product magnets.

Figure 2A:
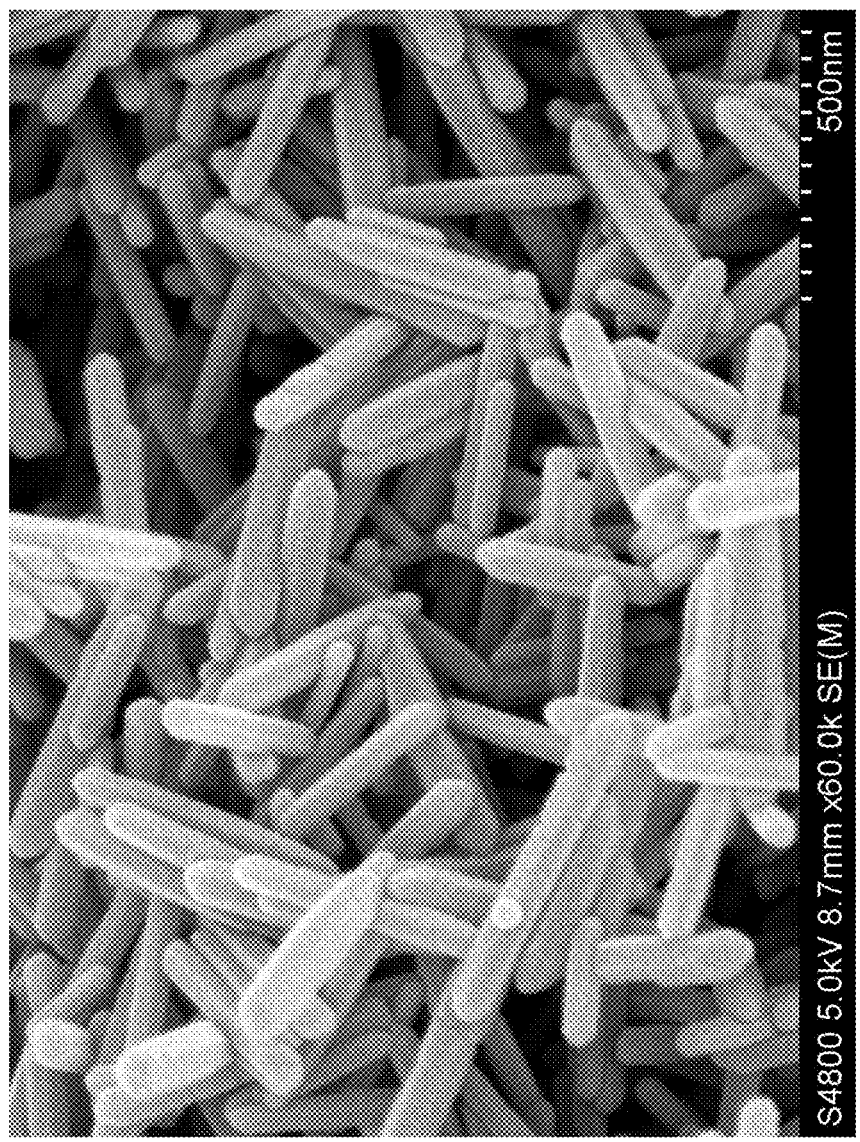
FIG. 2A shows an SEM image of the $Fe_2O_3$ nanorod morphology, in Example 2.
Figure 2B:
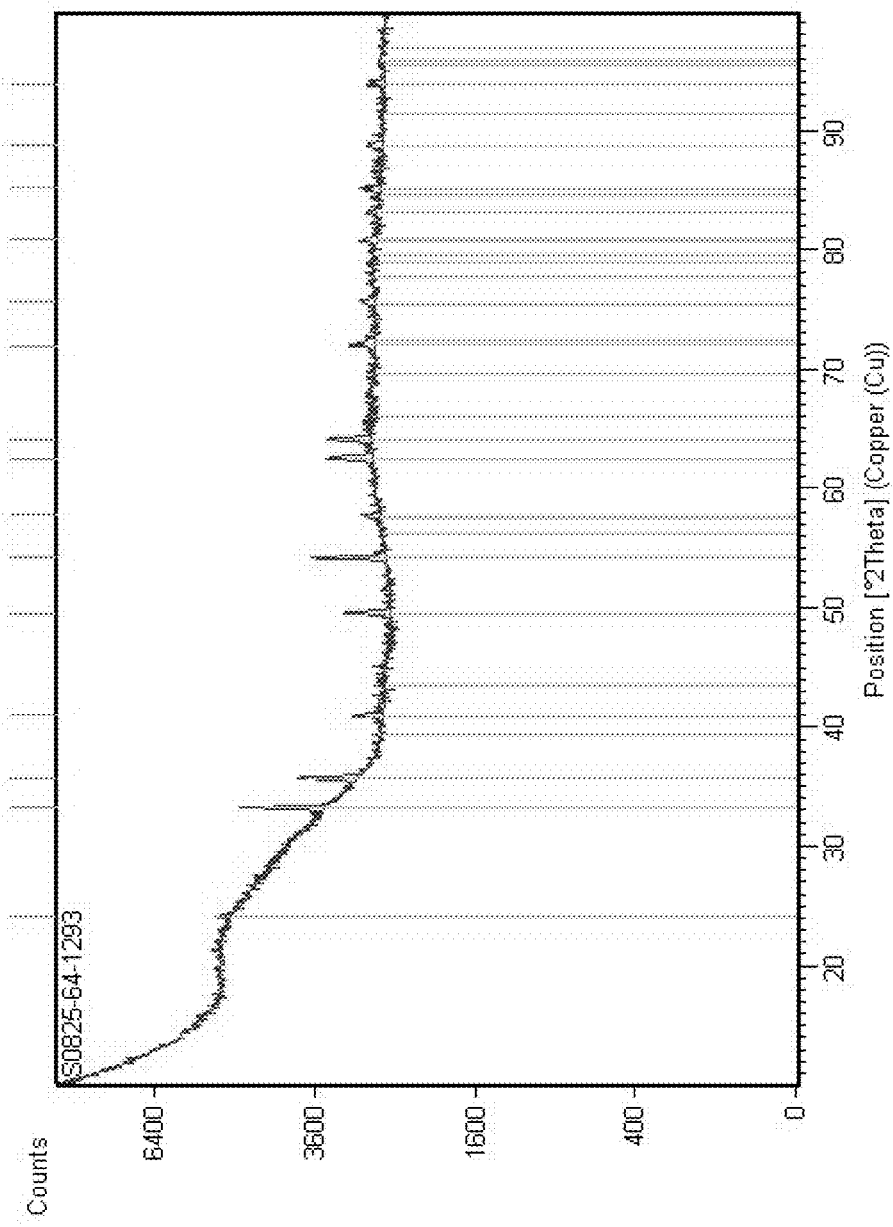
FIG. 2B shows an XRD pattern of the solid material, confirming the presence of $Fe_2O_3$ nanorods (reference pattern matches the data), in Example 2.

Example 2: Synthesis of $Al_2O_3$-Coated $Fe_2O_3$ Nanorods $Fe_2O_3$ nanorods are synthesized following Li et al., *Nanotechnology* 2009, 20, 245603, which is hereby incorporated by reference. Briefly, 1.627 g $FeCl_3.6H_2O$ is dissolved in 7 mL water and combined with 7 mL of 1,2-diaminopropane. This mixture is stirred for ten minutes and then sealed in a Teflon-lined 23 mL acid digestion bomb that is subsequently placed in a 195° C. oven for 24 h. The bomb is then removed from the oven, allowed to cool, and the solid contents are collected with centrifugation. The solids are suspended in methanol, centrifuged, and the supernatant discarded twice. Finally the solids are dried in a 60° C. oven in air for 12 h. FIG. 2A shows an SEM image of the $Fe_2O_3$ nanorod morphology. FIG. 2B shows an XRD pattern of the solid material, confirming the presence of $Fe_2O_3$ nanorods (reference pattern matches the data).

The thus-prepared $Fe_2O_3$ nanorods are coated with $Al_2O_3$ following Varanda et al., *J. Appl. Phys.* 2002, 92, 2079, which is hereby incorporated by reference. In short, 0.375 g of $Al_2O_3 \cdot 9H_2O$ is dissolved in 100 mL of water and the pH is brought up to 12.5 using 10% NaOH. Hematite rods are dispersed into the alkaline solution while constantly stirring to form a slurry. Carbon dioxide gas is subsequently blown into the slurry to neutralize it to a pH of 7.5, depositing a layer of $Al_2O_3$ onto the particles. The suspension is centrifuged, decanted and redispersed in water four times. Resulting solids are heated at 400° C. for 3 hours in air to allow for drying and dehydroxylation.

Figure 3:
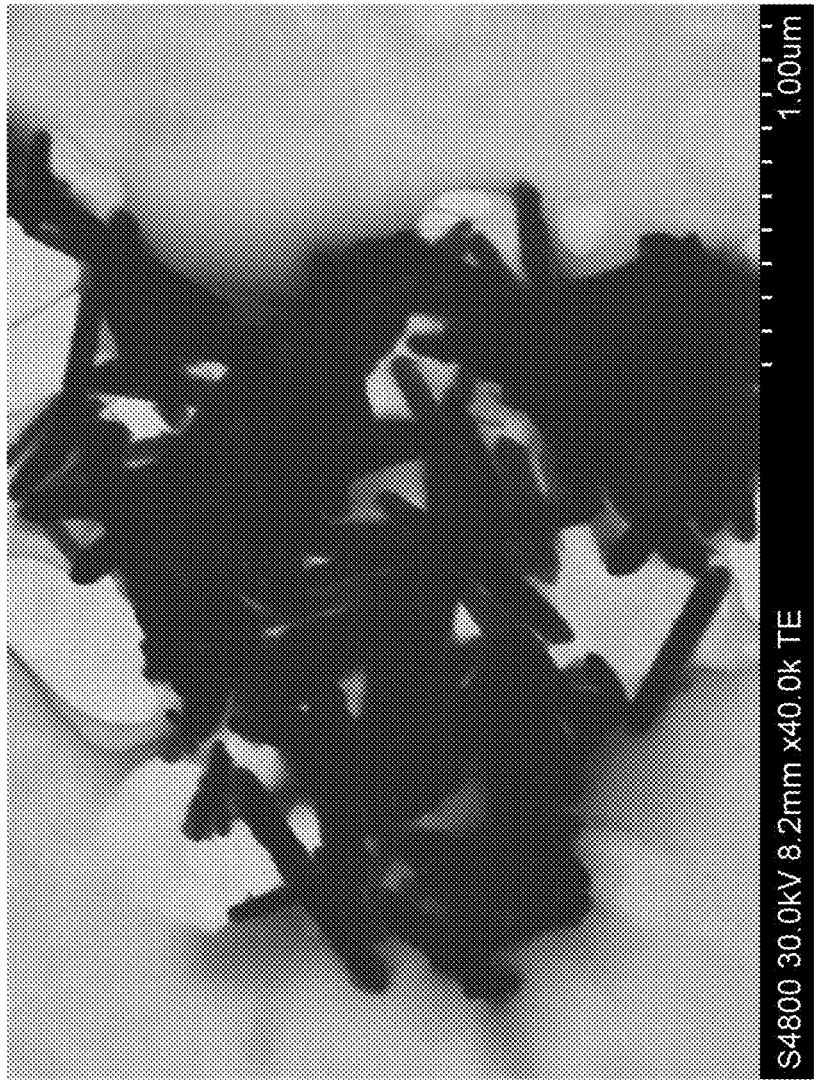
FIG. 3 shows a TEM image showing the morphology of the $Al_2O_3$-coated $Fe_2O_3$ nanorods after coating, in Example 2.

A TEM image showing the morphology of the $Al_2O_3$-coated $Fe_2O_3$ nanorods after coating is shown in FIG. 3.

Example 3: Reduction of $Al_2O_3$-Coated $Fe_2O_3$ Nanorods

Reduction of coated nanorods is carried out by placing 0.5 g of the Example 2 solids into a tube furnace and heating at 600° C. for 10 hours under a flowing 4% $H_2$ in Ar atmosphere. Upon completion of the reduction process, the furnace temperature is cooled to room temperature and resulting particles are maintained in an Argon atmosphere.

Figure 4A:
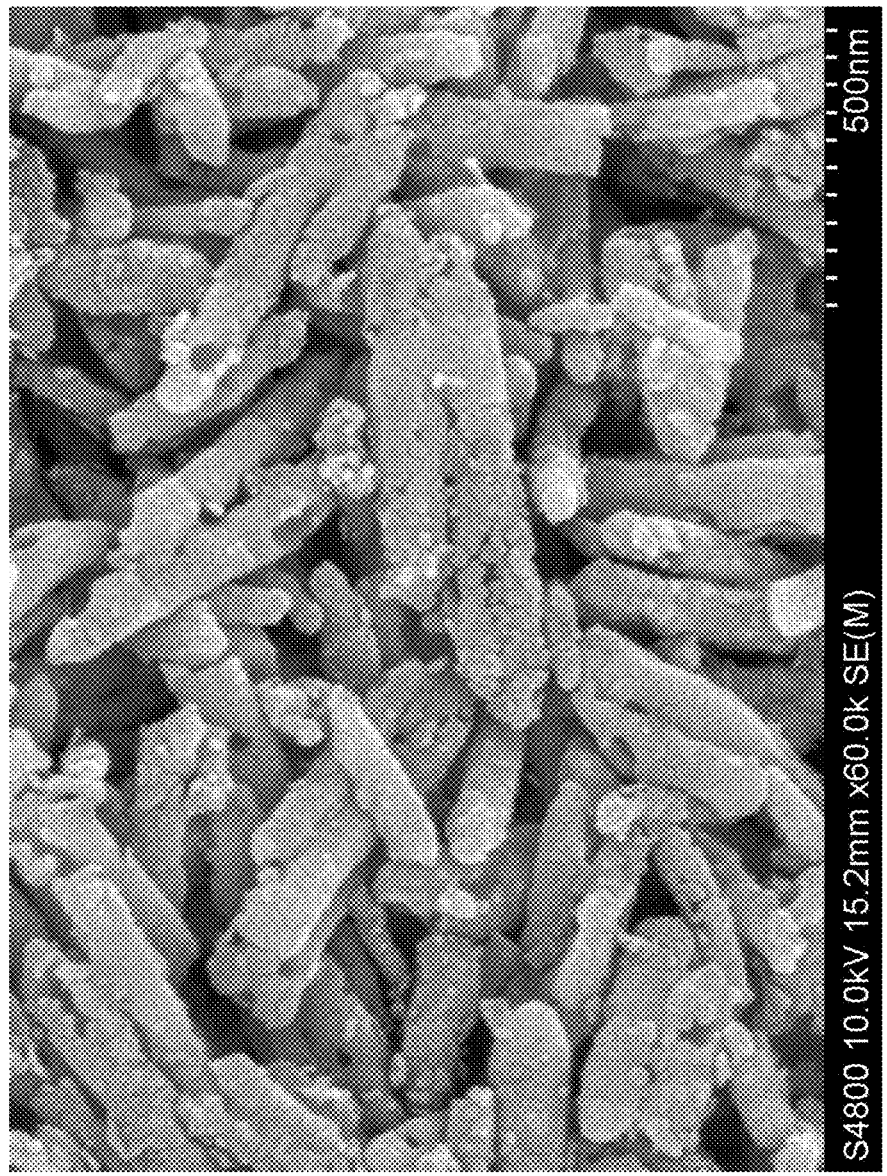
FIG. 4A shows an SEM image of resulting iron particles retaining rod morphology, in Example 3.
Figure 4B:
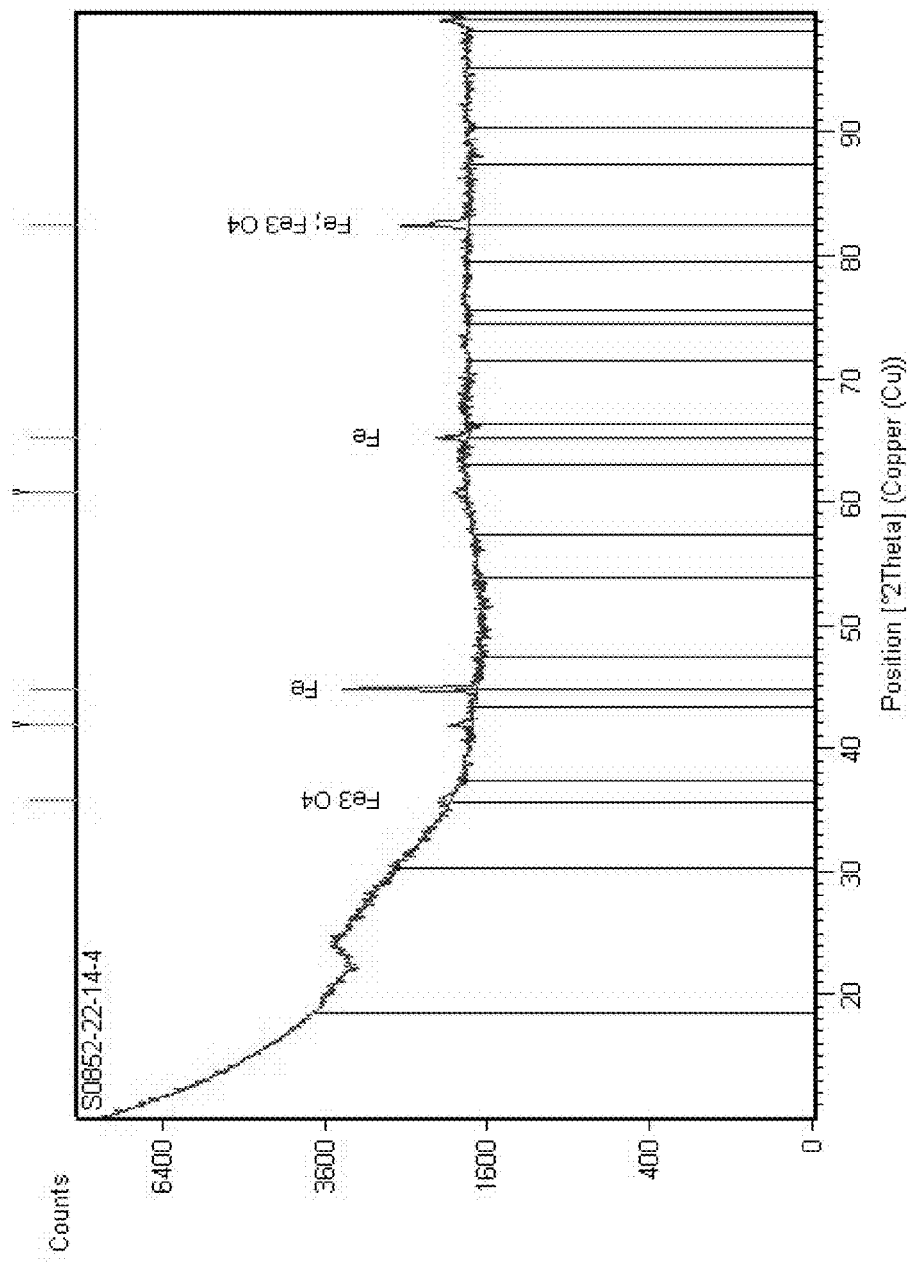
FIG. 4B shows an XRD pattern of reduced nanorods (XRD peaks are labeled on the graph), in Example 3.

FIG. 4A shows an SEM image of resulting iron particles. The SEM image reveals the retained rod morphology. FIG. 4B shows an XRD pattern of reduced nanorods. The XRD peaks are labeled on the graph, indicating the end material to be about 91% Fe and about 9% $Fe_3O_4$ on a weight basis.

Example 4: Synthesis of $Al_2O_3$-Coated FeOOH Nanorods

FeOOH nanorods are prepared according to Varanda et al., *J. Mater. Chem.*, 2002, 12, 3649-3653, which is hereby incorporated by reference. Briefly, 2.665 g of $Fe_2(SO_4)_3 \cdot nH_2O$ is dissolved in 50 mL of water in a polyethylene bottle and 1.4 mL of 2.5 M NaOH is added to reach a pH of 2.2. The resulting suspension is allowed to age for 4 h at 21° C., after which ferrihydrite precipitation is observed. The dissolution of the resulting precipitate is carried out by raising the pH to 9.5 by adding 50 mL of 1.5 M $Na_2CO_3$.

Additional aging is performed in two steps to separate particle nucleation from growth; first, the solution is allowed to age at 40° C. for 2 days and then at 60° C. for 3 days. The bottles are mixed occasionally every 24 hours for growth uniformity. The resulting precipitate is centrifuged and washed several times to remove impurities, and dried at 100° C. for 24 h.

Figure 5A:
FIG. 5A shows a TEM image of FeOOH nanorods morphology, revealing particles to be of 55 nm long and 10 nm wide, in Example 4.

FIG. 5A shows a TEM image of FeOOH nanorods morphology, revealing particles to be of 55 nm long and 10 nm wide. FIG. 5B shows an XRD pattern of FeOOH nanorods, confirming the resulting nanorods to be FeOOH (reference pattern matches the data).

The thus-prepared FeOOH nanorods are coated with $Al_2O_3$ as in Example 2. In short, 0.375 g of Al2O3.9H2O is dissolved in 100 mL of water and is alkalinized to a pH of 12.5 with 10% NaOH. FeOOH rods are dispersed into the alkaline solution while constantly stirring to form a slurry. Carbon dioxide gas is subsequently blown into the slurry to neutralize it to a pH of 7.7, depositing a layer of $Al_2O_3$ onto the particles. Finally, the coated $Fe_2O_3$ nanorods are centrifuged, washed several times with water and heated at 400° C. for 3 hours to allow for dehydroxylation.

Figure 6:
FIG. 6 shows a TEM image of FeOOH after coating with alumina, revealing the morphology of goethite nanorods coated with alumina, in Example 4.

FIG. 6 shows a TEM image of FeOOH after coating with alumina, revealing the morphology of goethite nanorods coated with alumina.

Example 5: Reduction of $Al_2O_3$-Coated FeOOH Nanorods

The Example 4 $Al_2O_3$-coated FeOOH nanorods are reduced as in Example 3, except that the heating temperature is adjusted to 500° C. and the heating time adjusted to 20 hours.

Figure 7A:
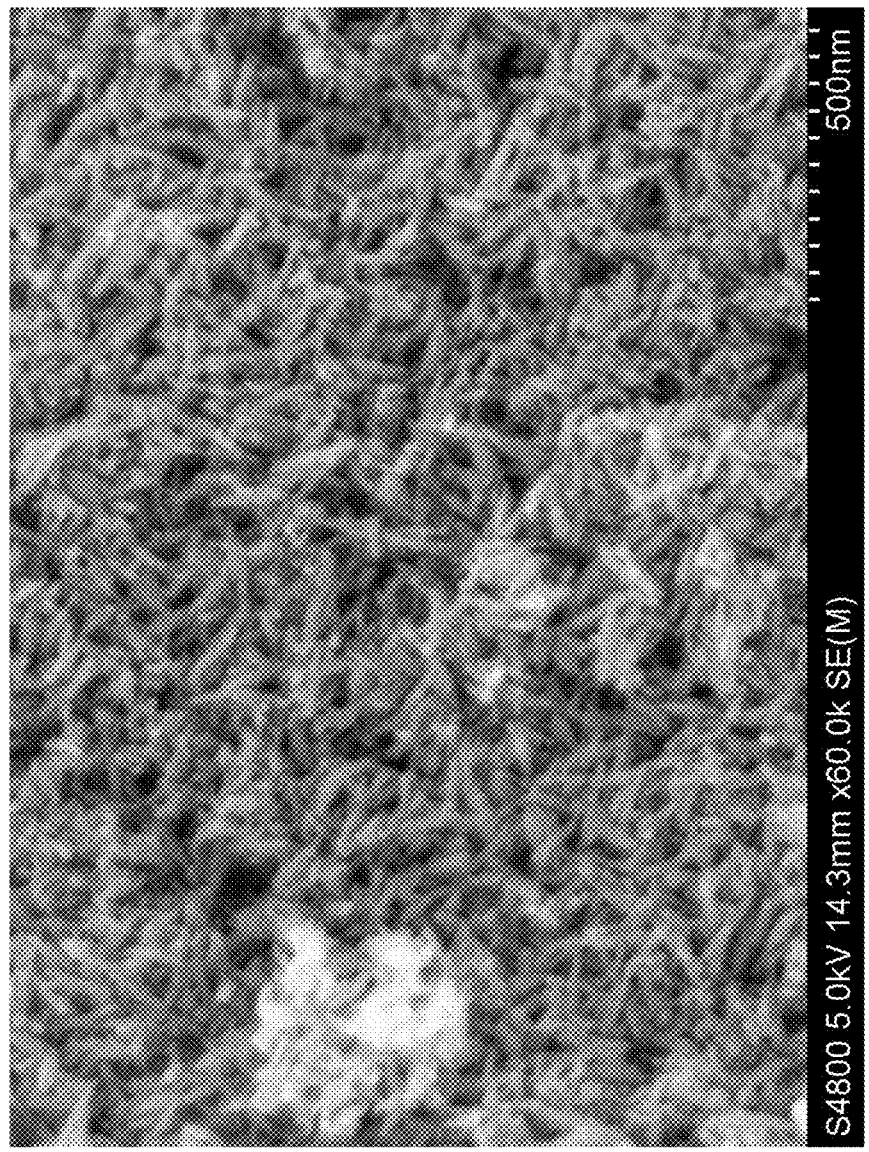
FIG. 7A shows an SEM image of metal iron particles resulting from FeOOH reduction with retained rod morphology, in Example 5.
Figure 7B:
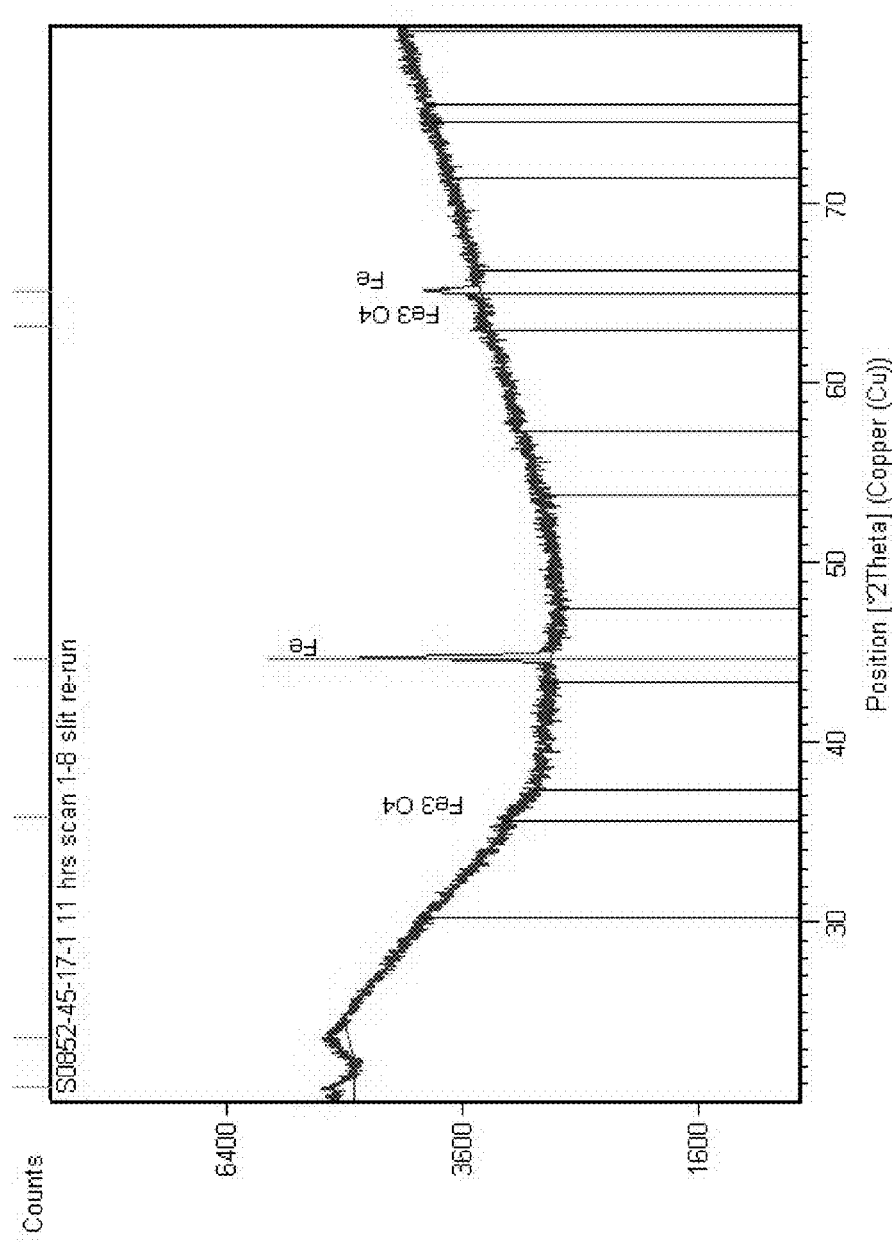
FIG. 7B shows an XRD pattern, revealing the end material to be about 94 wt % Fe and 6 wt % $Fe_3O_4$ (XRD peaks are labeled on the graph), in Example 5.

FIG. 7A shows an SEM image of metal iron particles resulting from FeOOH reduction with retained rod morphology. FIG. 7B shows an XRD pattern, revealing the end material to be about 94 wt % Fe and 6 wt % $Fe_3O_4$ (XRD peaks are labeled on the graph).

Example 6: Alignment of $Fe_2O_3$ Nanorods

A resorcinol-formaldehyde matrix is generated from 10 g of resorcinol and 10 mg $Na_2CO_3$ dissolved in 14.944 g of 36.5 wt % formaldehyde in water solution. This solution is allowed to sit for 24 h at room temperature before use.

0.350 g of Example 2 $Fe_2O_3$ nanorods are mixed with 0.175 g of the resorcinol-formaldehyde matrix in a mortar and pestle. One drop of this solution is placed between two 1"×3" glass slides and the slides are sheared against one another along their long axis and then placed in a 50° C. oven for 12 hours. The sample is then examined with SEM and partial alignment is observed as shown in FIG. 8.

Note that it is also possible to shear the slides against one while they are in and a 50° C. oven for 12 hours, i.e. the nanorod alignment may be simultaneous with matrix curing. Also, an AC or DC magnetic field may be configured to align the nanorods instead of the shearing alignment, or in addition to the shear alignment, and such a magnetic field may be optionally introduced during curing (i.e. the oven may include internal elements for, or be adapted for external elements for, generating an AC or DC magnetic field).

Figure 8:
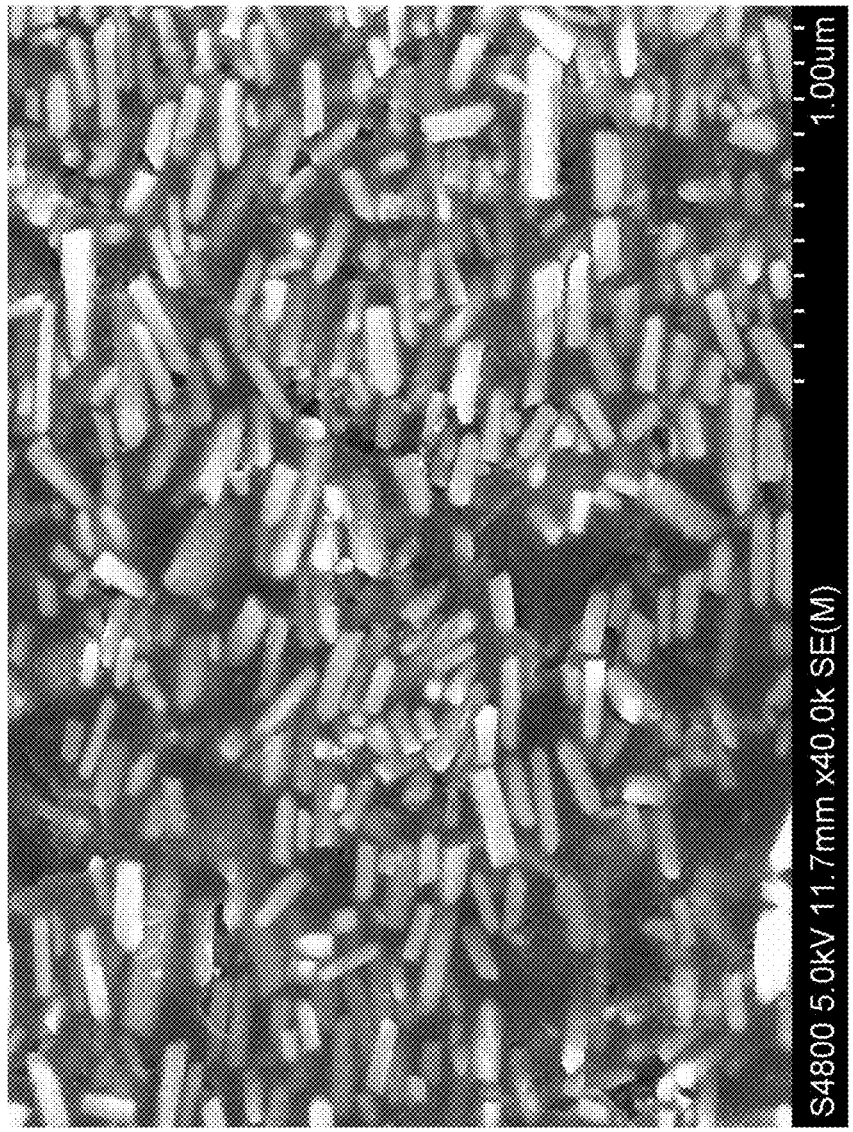
FIG. 8 shows an SEM image of iron oxide particles contained in a sheared resorcinol-formaldehyde matrix, in Example 6 of the invention.

FIG. 8 is an SEM image of iron oxide particles contained in a sheared resorcinol-formaldehyde matrix.

Example 7: Reduction of $Fe_2O_3$ Nanorods

A polyfurfuryl alcohol matrix is generated from 95 mg of p-toluenesulfonic acid dissolved in 5 mL of tetrahydrofuran. This solution is cooled in an ice bath and over one hour 10 mL of furfuryl alcohol is added. The ice bath is allowed to melt and warm to room temperature and the mixture is stirred for 48 hours. Then an additional 285 mg of p-toluenesulfonic acid is added and tetrahydrofuran is removed by bubbling $N_2$ gas through the suspension for 2 hours.

Figure 9A:
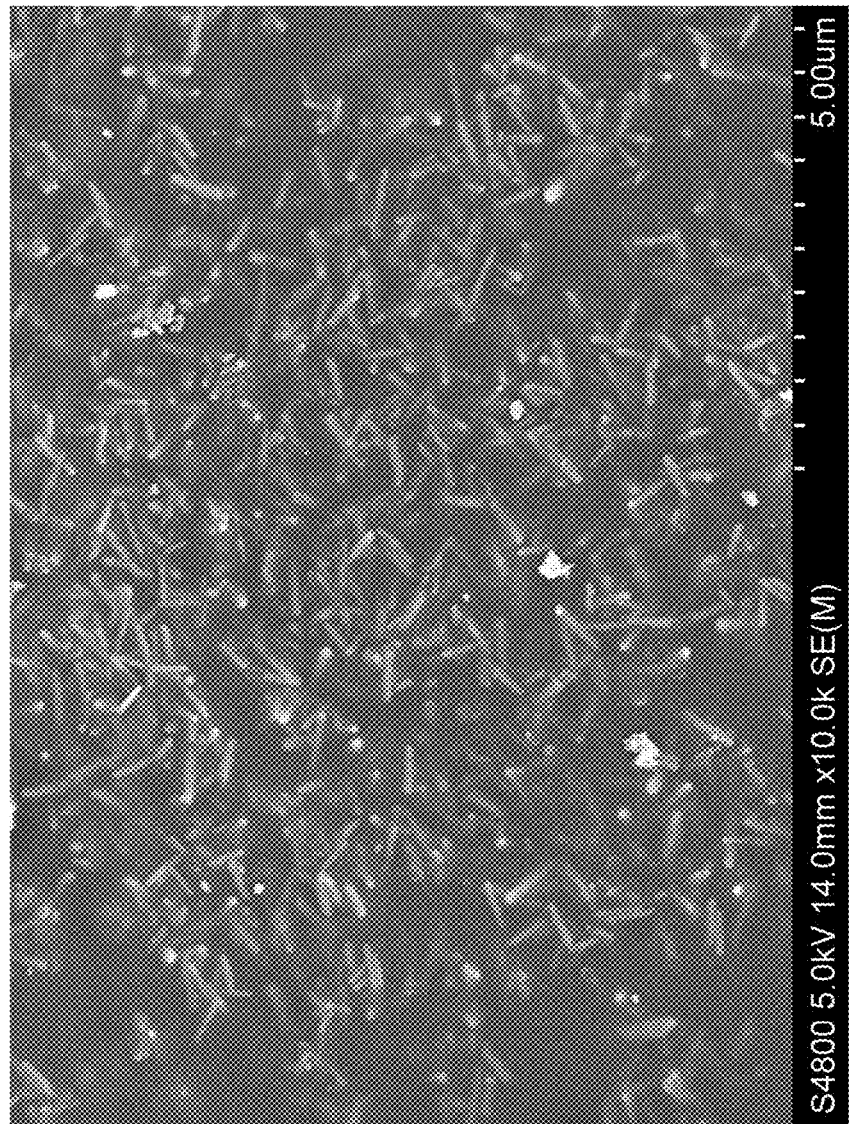
FIG. 9A shows an SEM image of iron nanorods in a carbonized polyfurfuryl alcohol matrix, in Example 7.

Then 38 mg of Example 4 $Al_2O_3$-coated $Fe_2O_3$ nanorods are mixed with 0.147 g of the polyfurfuryl alcohol matrix in a Thinky mixer for 5 minutes. This material is deposited on an aluminum plate and heated at 80° C. for 12 h and then 125° C. for 3 h under Ar. Then the composite is scraped of the aluminum plate and heated in a tube furnace at 735° C. for 6 hours under a flowing 4% $H_2$ in Ar atmosphere. These conditions transform polyfurfuryl alcohol to glassy carbon as well as reduce iron oxide to iron. The product is brought into an Ar-filled glove box and analyzed with XRD (FIG. 9B) and SEM (FIG. 9A). The nanorod shapes are retained.

Figure 9B:
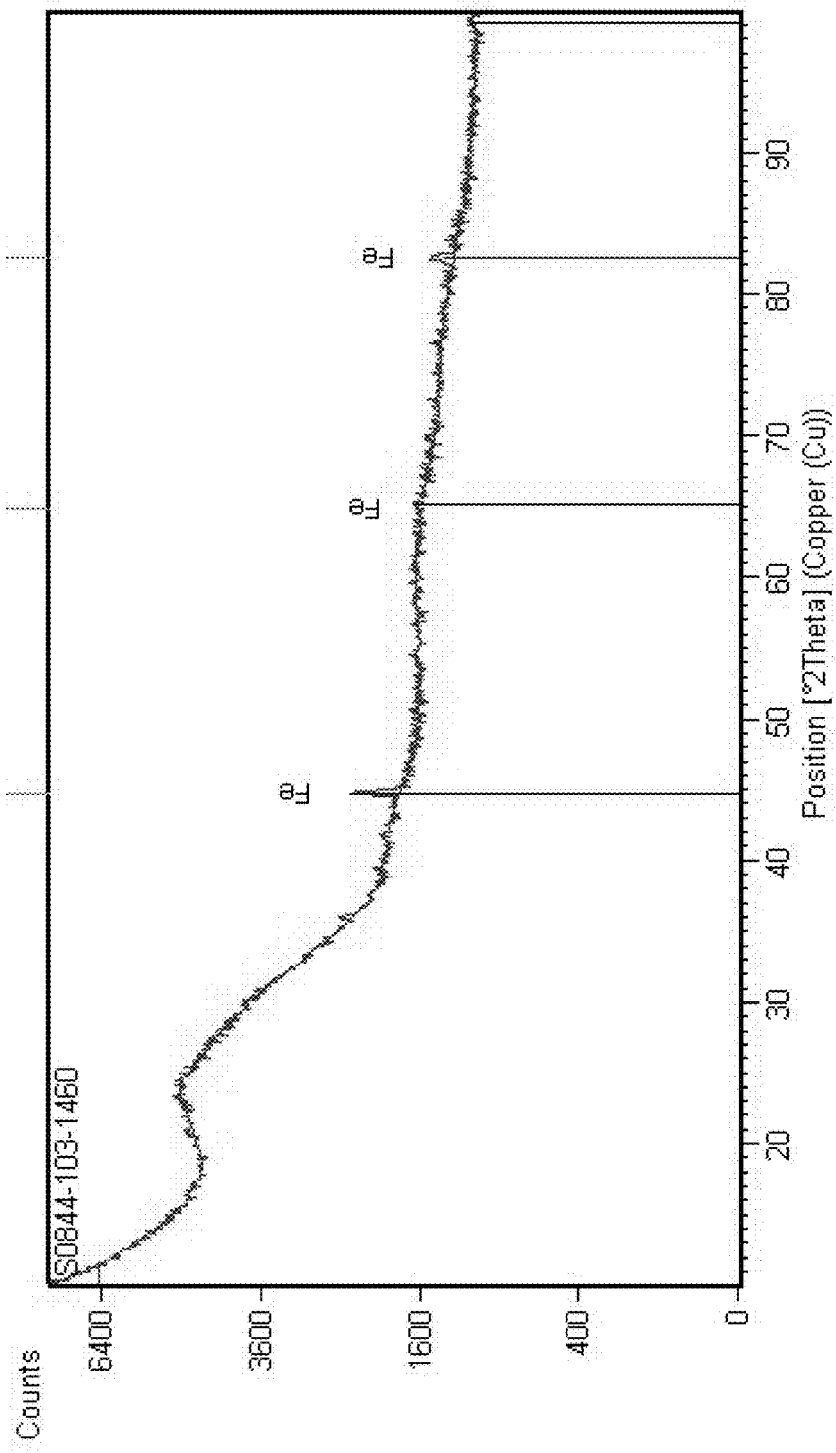
FIG. 9B shows an XRD pattern of $Al_2O_3$-coated $Fe_2O_3$ nanorods in a polyfurfuryl alcohol matrix after reduction, in Example 7.

FIG. 9A is an SEM image of iron nanorods in a carbonized polyfurfuryl alcohol matrix. FIG. 9B is an XRD pattern of $Al_2O_3$-coated $Fe_2O_3$ nanorods in a polyfurfuryl alcohol matrix after reduction. The XRD peaks are labeled on the graph and match the reference pattern for iron.

The magnetic nanocomposites provided herein may be used in a wide variety of magnets or magnet systems. Variations of the invention are useful for operating electromagnets, such as (but not limited to) in electric-vehicle drive motors, windshield wiper motors, starter motors, and aircraft pumps and actuation.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A magnetic nanocomposite comprising (a) magnetic metallic nanorods dispersed within a substantially continuous and rigid non-metallic matrix and (b) one or more magnetic nanoparticles dispersed within said matrix, wherein said magnetic nanoparticles support electromagnetic coupling between said nanorods, wherein said nanorods have an average nanorod length-to-width ratio of at least 2, wherein at least 10% of said nanorods are aligned in one axial direction, wherein at least some of said nanorods are coated with a metal oxide, and wherein said nanorods are essentially free of rare-earth elements.

2. The magnetic nanocomposite of claim 1, wherein essentially all of said nanorods are aligned in one axial direction.

3. The magnetic nanocomposite of claim 1, wherein said average nanorod length-to-width ratio is at least 4.

4. The magnetic nanocomposite of claim 1, wherein said nanorods have an average diameter of about 60 nanometers or less.

5. The magnetic nanocomposite of claim 1, wherein said nanorods are present from about 10 vol % to about 90 vol % of said magnetic nanocomposite.

6. The magnetic nanocomposite of claim 5, wherein said nanorods are present from about 30 vol % to about 70 vol % of said magnetic nanocomposite.

7. The magnetic nanocomposite of claim 1, wherein said nanorods contain one or more materials selected from the group consisting of iron, iron-cobalt alloys, iron-nickel alloys, iron-gallium alloys, and oxides, oxyhydroxides, nitrides, sulfides, or carbides thereof.

8. The magnetic nanocomposite of claim 7, wherein said nanorods are essentially free of precious metals.

9. The magnetic nanocomposite of claim 1, wherein said matrix is a thermoset material cured from a viscous-liquid or soft-solid precursor material.

10. The magnetic nanocomposite of claim 1, wherein said matrix is formed from a material selected from the group consisting of graphitic carbon, glassy carbon, polyfurfuryl alcohol, resorcinol-formaldehyde, and combinations or derivatives thereof.

11. The magnetic nanocomposite of claim 1, wherein said magnetic nanoparticles are selected from the group consisting of iron oxide nanoparticles, iron oxyhydroxide nanoparticles, cobalt oxide nanoparticles, cobalt ferrite nanoparticles, and combinations thereof.

12. A method of forming a magnetic nanocomposite, said method comprising:
   (a) dispersing metal oxide nanorods into a hardenable non-metallic material;
   (b) thermally or chemically reducing said metal oxide nanorods to form magnetic metallic nanorods;
   (c) before, during, or after step (b), aligning at least 10% of said metal oxide or metallic nanorods in one axial direction within said hardenable non-metallic material; and
   (d) hardening said hardenable non-metallic material to form a substantially continuous and rigid non-metallic matrix containing said metallic nanorods,
   wherein said non-metallic matrix further contains one or more magnetic nanoparticles, wherein said magnetic nanoparticles support electromagnetic coupling between said metallic nanorods,
   wherein at least some of said nanorods are coated with a metal oxide,
   wherein said metallic nanorods are essentially free of rare-earth elements, and
   wherein said metallic nanorods have an average nanorod length-to-width ratio of at least 2.

13. The method of claim 12, wherein said metal oxide or metallic nanorods are aligned in step (c) using magnetic forces.

14. The method of claim 12, wherein said metal oxide or metallic nanorods are aligned in step (c) using physical forces.

15. The method of claim 12, wherein essentially all of said metal oxide or metallic nanorods are aligned in step (c) in one axial direction.

16. The method of claim 12, wherein said reducing in step (b) comprises introduction of a reducing agent selected from the group consisting of hydrogen, carbon, carbon monoxide, synthesis gas, methane, hydrogen sulfide, and combinations thereof.

17. The method of claim 16, wherein said reducing agent is hydrogen.

18. The method of claim 12, wherein said reducing in step (b) utilizes carbothermal reduction of said metal oxide nanorods to said metallic nanorods.

19. The method of claim 12, wherein said reducing and said hardening are performed simultaneously.

20. The method of claim 12, wherein said metallic nanorods contain one or more materials selected from the group consisting of iron, iron-cobalt alloys, iron-nickel alloys, iron-gallium alloys, and oxides, oxyhydroxides, nitrides, sulfides, or carbides thereof.

21. The method of claim 20, wherein said metallic nanorods are essentially free of precious metals.

22. The method of claim 12, wherein said hardenable non-metallic material is a viscous liquid or soft solid, and wherein said non-metallic matrix is a thermoset material.

23. The method of claim 12, wherein said non-metallic matrix is formed from a material selected from the group consisting of graphitic carbon, glassy carbon, polyfurfuryl alcohol, resorcinol-formaldehyde, and combinations or derivatives thereof.

24. The method of claim 12, wherein said one or more magnetic nanoparticles are selected from the group consisting of iron oxide nanoparticles, iron oxyhydroxide nanoparticles, cobalt oxide nanoparticles, cobalt ferrite nanoparticles, and combinations thereof.

* * * * *